United States Patent [19]
Goforthe

[11] Patent Number: 4,971,498
[45] Date of Patent: Nov. 20, 1990

[54] CANTILEVERED WASHER FOR A FASTENER

[75] Inventor: Ronald D. Goforthe, Birmingham, Mich.

[73] Assignee: R. L. Industries, Birmingham, Mich.

[21] Appl. No.: 184,756

[22] Filed: Apr. 22, 1988

[51] Int. Cl.⁵ ............................................. F16B 35/04
[52] U.S. Cl. ...................................... 411/134; 411/11; 411/368; 411/533; 301/9 DN
[58] Field of Search ............... 411/368, 372, 544, 432, 411/371, 533, 150, 10, 11, 156, 537, 538, 535, 536, 531, 155, 134, 14, 8, 9; 301/9 DN

[56] References Cited
U.S. PATENT DOCUMENTS

| 1,641,059 | 8/1927 | Tausch | 411/155 |
| 1,961,470 | 6/1934 | Winchester et al. | 411/155 X |
| 2,169,047 | 8/1939 | Horn | 301/9 DN X |
| 2,284,824 | 6/1942 | Hungerford | 411/432 X |
| 2,597,835 | 5/1952 | Eksergian | 411/368 X |
| 2,867,874 | 1/1959 | Larson | 411/371 X |
| 3,016,941 | 1/1962 | Coldren | 411/150 X |
| 3,085,312 | 4/1963 | Evans . | |
| 3,135,154 | 6/1964 | Zenzic | 411/537 X |
| 4,431,353 | 2/1984 | Capuano | 411/11 |

FOREIGN PATENT DOCUMENTS

| 4185 | 9/1979 | European Pat. Off. | 411/533 |
| 674944 | 10/1929 | France | 411/155 |
| 846823 | 7/1981 | U.S.S.R. | 411/11 |
| 2071250 | 9/1981 | United Kingdom | 411/368 |

Primary Examiner—Rodney M. Lindsay
Attorney, Agent, or Firm—Remy J. VanOphem

[57] ABSTRACT

A cantilevered washer for a male or female threaded fastener having a conical seat portion including an conically-shaped seat for receiving the threaded fastener in such maner as to load the washer at an angle and relieve hoop-stress on the threaded fastener. The washer further has an annular ring portion including a flat annular base for mating with a surface of a part being fastened. The annular ring portion and the conical seat portion are connected by a cantilever portion which is inclined at an angle of substantially 45° to the flat bearing portion in order to provide a low profile vertical displacement between the conical seat portion and the flat bearing portion, as well as provide a location for deflection of variable bearing loads. Since deflection occurs only at the cantilever portion and since the conically-shaped seat loads the washer at an angle, brinelling into the surface of a part being fastened is essentially eliminated and loosening of a threaded fastener during operation is prevented. The washer is preferred to be fabricated using cold forming tenchniques in order to ensure proper metal grip structure so that deflection at the cantilever portion is predictable and free of metal fatigue. The washer is further preferred to be connected with an associated threaded fastener in a manner that permits free relative rotation therebetween.

29 Claims, 2 Drawing Sheets

CANTILEVERED WASHER FOR A FASTENER

BACKGROUND OF THE INVENTION

1. FIELD OF THE INVENTION

The present invention relates to washers for both male and female threaded fasteners, more particularly to a washer having an integral cantilever which provides for a precisely controlled amount of deflection at the cantilever, thereby eliminating deflection at the location where the washer bears against a mating surface, resulting in an absence of brinelling thereinto.

2. DESCRIPTION OF THE PRIOR ART

While the inherent strength and operational simplicity of male and female threaded fasteners have made their use universal, several problems attend their use. These problems include inability to deflect under varying load conditions, loosening during operation, hoop-spreading due to overtightening or excessive loading, and brinelling into the surface of the parts being joined.

Many solutions have been devised in the prior art to rectify, or at least mitigate, the aforesaid problems associated with threaded fasteners. Generally, these solutions teach a washer which is structured to interact with a threaded fastener to solve one or more of the aforesaid problems.

Examples of solutions to the problem of the inability to deflect under varying load conditions include the following. U.S. Pat. No. 1,352,918 to Rohbock discloses a pair of seat plates which are each provided with an annular flange creating a recessed cavity on its inner face. The seat plates further have a concavely-shaped portion for receiving a convexly-shaped portion of a bolt or nut. U.S. Pat. No. 1,961,470 to Winchester discloses a frusto-spherical cup-shaped washer which is rotatably connected to a nut at a conically-shaped seat. Each of these solutions suffer from the drawback that they impose columnar loading directly onto the mating surface when a force is imposed which is along the axis of the threaded fastener. As a result, the variation of loading conditions is accommodated by compression, the degree of which depends upon the modulus of the material. Compressive response to variations in loading conditions is not a true deflection response, and usually results in brinelling into the mating surface, as well as fatigue failure and unpredictable loosening of the threaded fastener.

Further examples of solutions to the problem of inability to deflect under varying load conditions include U.S. Pat. No. 1,412,502 to Andrioli and U.S. Pat. No. 3,135,154 to Zenzic which disclose washer and nut devices which accommodate transverse forces originating in the fastened parts, but are not capable of accommodating deflection along the axis of the threaded fastener.

The problem of loosening is frequently handled by common split and unsplit lock washers. Examples of other solutions contained in the prior art include: U.S. Pat. No. 3,062,252 to Jackman which discloses a cone-shaped lock washer that includes an abutment to prevent hoop-spreading of its associated nut; U.S. Pat. No. 3,144,803 to Briles which discloses a lock washer having a peripheral lip that is spaced from its associated nut and engages the nut as the nut is threaded onto a bolt; and U.S. Pat. No. 3,476,010 to Markey which discloses a lock washer having a curved cross section and a humped portion that are flattened as its associated nut is threaded onto a bolt. A variation of these devices is U.S. Pat. No. 3,742,808 to Trembley which discloses a self-sealing nut having a washer separated from its associated nut by a powdered Teflon sealant.

The problem of hoop-spreading arises because the portion of a nut closest to the mating surface of a part that is being fastened is subjected, as a result of a combined loading from each of the threads of the nut, to forces which tend to spread or enlarge its cross section. Indeed, this high tension loading at the first one or two threads of the nut results in extremely high forces being applied to the bolt. Thus, it is common experience that bolts generally fail at a location defined by the plane of the joined parts. An example of a solution to the stress loading on nuts is disclosed in U.S. Pat. No. 3,087,371 to Orner wherein a nut having a conical portion mates with a conical portion of a washer, the washer providing circumferential strength to the nut at the highest point of stress. Further, overloading is prevented by providing an abutment on the nut calibrated to abut the parts being joined before a predetermined stress loading is reached. U.S. Pat. No. 2,588,372 to Erb is a further example of a nut having a conical portion intended for mating with a conical portion of a washer in order to control hoop-stress on the nut. U.S. Pat. No. 2,552,004 to Erdman is directed to solving a problem associated with the tendency of a bolt to fail at the point of connection of its head to its shank. Erdman teaches a bolt shank concavely spreading to meet the bolt head and a convexly-shaped mating portion of a washer that is used to distribute loading to the bolt head from the parts being joined.

The problem of brinelling, in which a threaded fastener or its associated washer is caused to embed into the surface of a part being fastened together, has frequently been solved by utilizing larger area washers and alternative materials which are less subject to wear. For example, U.S. Pat. No. 3,212,387 to Madansky discloses a solution particularly directed to surface galling by use of a plastic captive screw washer which provides protection against injury to the surface of the part being joined by the head of a bolt.

While the aforesaid proposed solutions to the problem associated with threaded fasteners may be acceptable in many applications, they are generally inadequate when addressing the unique and particularly demanding conditions encountered in motor vehicle usage, in which stud bolts and stud nuts that are used to secure wheels onto hubs are continually subjected to severe vibration and wide ranges in load variation.

In order to secure an effective connection of a wheel to the hub in a manner that will support the vehicle and, in addition, withstand loading caused by impact of the wheel with road hazards, two generally accepted threaded fastener systems are in use: stud-piloted wheels and hub-piloted wheels.

Stud-piloted wheels utilize a plurality of apertures arranged in a circular pattern, each aperture having a conical surface. These apertures are aligned with threaded studs on the hub. Stud nuts, which are used to secure the wheel to the hub, have a conically-shaped portion that complementarily mates with the conical surface of the wheel apertures. In this system, the wheel is seated and centered by alignment of the threaded studs projecting through the wheel apertures as well as the interaction of the conical surfaces of each of the wheel apertures with the conical surface of a prospective stud that has been inserted therethrough. The complementary conical surfaces provide precise final alignment of the wheel in addition to providing clamping of the wheel onto the hub.

Stud-piloted wheels are used primarily in automotive applications. Clearly, the problem of hoop-spreading is solved by this threaded fastener system, but there still remains a substantial problem relating to deflection inability, loosening and brinelling. In this regard, U.S. Pat. No. 3,386,771 to Verierr et al discloses a washer having a portion of either conical or spherical shape that is structured to fit into a complementarily shaped aperture. The washer may also have a slit to facilitate alignment and proper fitting. The washer cooperates with a stud nut at a mutually flat surface. As an additional example, U.S. Pat. No. 2,844,409 to Eksergian discloses a stud nut having a convexly-shaped portion which is structured to mate with a concavely-shaped portion of a washer. The washer further has a convexly-shaped portion structured to mate with a tapered portion of the wheel stud aperture. The washer has a flange portion which assumes the clamping pressure when the stud nut is fastened onto the stud.

Hub-piloted wheels also utilize a plurality of apertures arranged in a circular pattern, but the apertures do not include a conical surface. Further, the stud nuts do not have a conically-shaped portion. Alignment is established by interaction between a center hole in the wheel with receptive ledges machined into the hub. Consequently, there is no need for conical surface cooperation between the wheel apertures and the stud nuts. Since the hub itself serves to align the wheel, the number of studs required to safely secure the wheel to the hub is greatly reduced, frequently in half. In the prior art, a preferred form of nut therefor has been a cone locknut with a fitted flat washer of the type disclosed in the aforesaid U.S. Patent to Erb.

As mentioned above, because of varying loads and vibrational conditions to which motor vehicle wheels are constantly subjected, the threaded fasteners used to secure the wheel onto the hub are subject, acutely, to all the aforesaid problems of deflection inability, loosening, hoop-spreading and brinelling.

Hub-piloted wheels are finding increasing favor among truck manufacturers because of improved economy and load bearing capacity as compared with stud-piloted wheels. However, hub-piloted wheels suffer even more from the effects of vibration and load variation than do stud-piloted wheels. In the prior art, it has been suggested to add additional studs, increase the size of the studs and nuts, increase the thickness of the wheel disk, and provide thicker, wider washers, in order to solve these problems. However, none of these suggestions prevent loosening and brinelling because of continual load variation and vibration, which causes the tightest of nuts to embed into the wheel disk and eventually work loose. Frequent tightening is required and this only leads to progressive brinelling.

Accordingly, there remains in the prior art the need to devise a threaded fastener system which is immune to the aforesaid problems associated with threaded fasteners, and which is particularly well suited for use in motor vehicle hub-piloted wheels.

SUMMARY OF THE INVENTION

The present invention discloses a washer for a threaded fastener, either male or female, in which the washer includes a cantilever portion for accommodating deflection, an annular ring potion having a cross-sectional thickness greater than the cross-sectional thickness of the cantilever portion, and a conical seat for receiving a conical portion of the threaded fastener. The conical seat causes the washer to be loaded at an angle adjacent the aforesaid cantilever portion. As a result of this structure, the washer has true torsional properties, rather than simple columnar compressivity. Further, because the washer is loaded on an angle and because the cantilever portion is angled as well, the deflection will occur at the cantilever portion and yet the flat mating surface on the annular ring portion will remain flat relative to the surface of a part to which it is mated. As a result of these features of the structure, a low profile is achieved, true deflection is present, and brinelling, loosening, and hoop-spreading are prevented.

In order to achieve the foregoing properties of the cantilevered washer according to the present invention, it is preferred that the washer be cold formed in order that an appropriate grain structure be provided that will allow the aforesaid deflection, as well as ensure continued operation under conditions of vibration and variable loading, as occur most particularly in motor vehicle wheel threaded fasteners, without fear of metal fatigue failure.

Accordingly, it is an object of the present invention to provide a washer for a thread fastener, the washer including a cantilever for accommodating deflection.

It is a further object of the present invention to provide a washer for a threaded fastener, the washer having a conical seat for receiving a conically-shaped portion of a threaded fastener, the conical seat loading the washer on an angle defined by the conical seat.

It is yet a further object of the present invention to provide a washer for a threaded fastener, the washer having a conical seat and a cantilever portion, the combination of which provide accommodation for deflection, uniform loading, and flat mating with an adjacent part surface.

It is still a further object of the present invention to provide a washer for a threaded fastener, the washer having a conical seat and a cantilever portion, the combination of which provide a low profile accommodation of deflection caused by variable bearing loads that are oriented in a direction that is parallel with the axis of the washer, and elimination of loosening, hoop-spreading and brinelling.

These and other objects, advantages, features, and benefits of the invention will become apparent from the following specification.

DETAILED DESCRIPTION OF THE PREFERRED EMBODIMENT

Figure 1:
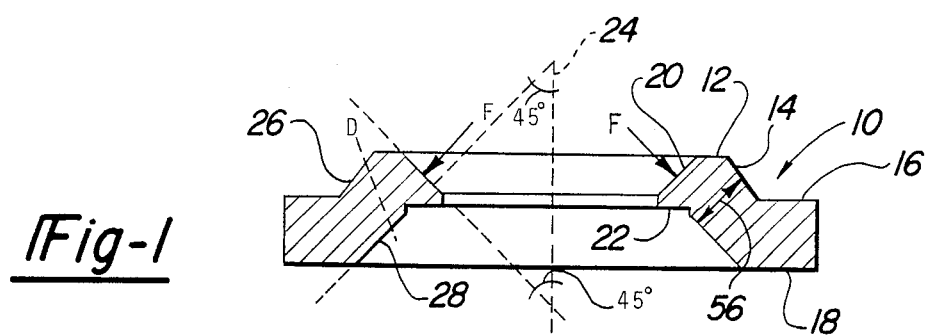
FIG. 1 is a sectional side view of the cantilevered washer according to the present invention.
Figure 2:
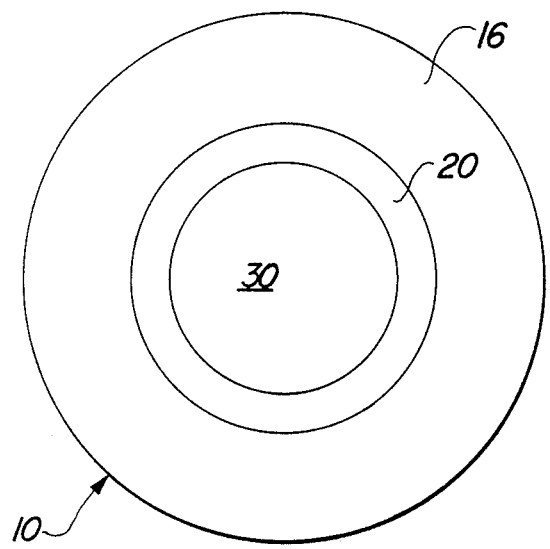
FIG. 2 is a plan view of the cantilevered washer of FIG. 1.
Figure 6:
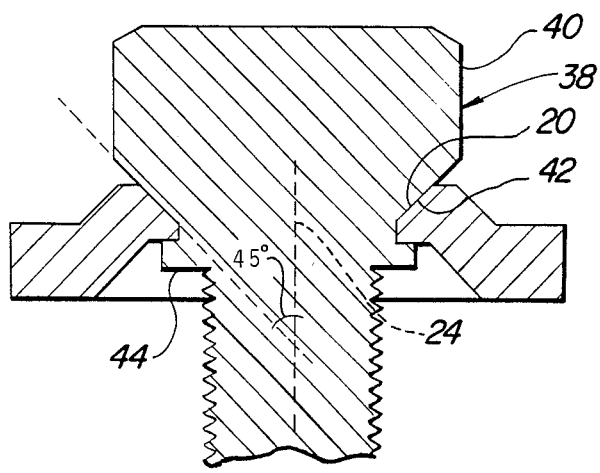
FIG. 6 is a sectional side view of the cantilevered washer of FIG. 1 combined with a male threaded fastener.

Referring now to the figures, FIG. 1 shows a cantilevered washer 10 according to the present invention. The cantilevered washer is composed of a single piece unit having three integral portions: a conical seat portion 12, a cantilever portion 14 and an annular ring portion 16. The annular ring portion has a flat annular base 18 for mating with a secondary part, as depicted in FIG. 6. The annular ring portion is preferably rectangular in cross section. The conical seat portion 12 includes a conically-shaped seat 20. Adjacent the conically-shaped seat is an annular shoulder 22. Between the conical seat portion 12 and the annular ring portion 16 is located the cantilever portion 14. The cantilever portion connects the annular ring portion with the conical seat portion and serves to offset the annular conical seat portion in relation to the ring portion along a washer center axis 24. The cantilever portion 14 is shaped in the form of an outer frustoconical surface 26 and an inner frustoconical surface 28 which is in substantially parallel alignment with the outer frustoconical surface. One end of the inner frustoconical surface abuts the annular shoulder 22. As can be particularly seen in FIG. 2, the annular shoulder forms an annular aperture 30 into which a threaded fastener may be located. It is preferred that the conically-shaped seat and the inner frustoconical surface each be angled at 45° relative to the washer center axis.

Figure 3:
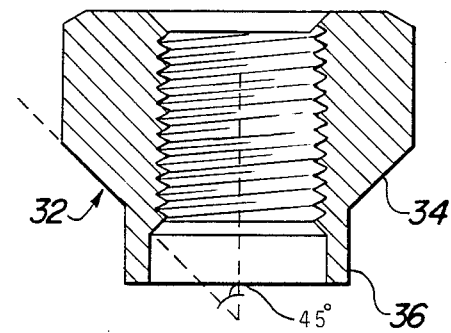
FIG. 3 is a sectional side view of a female threaded fastener according to the present invention.
Figure 4:
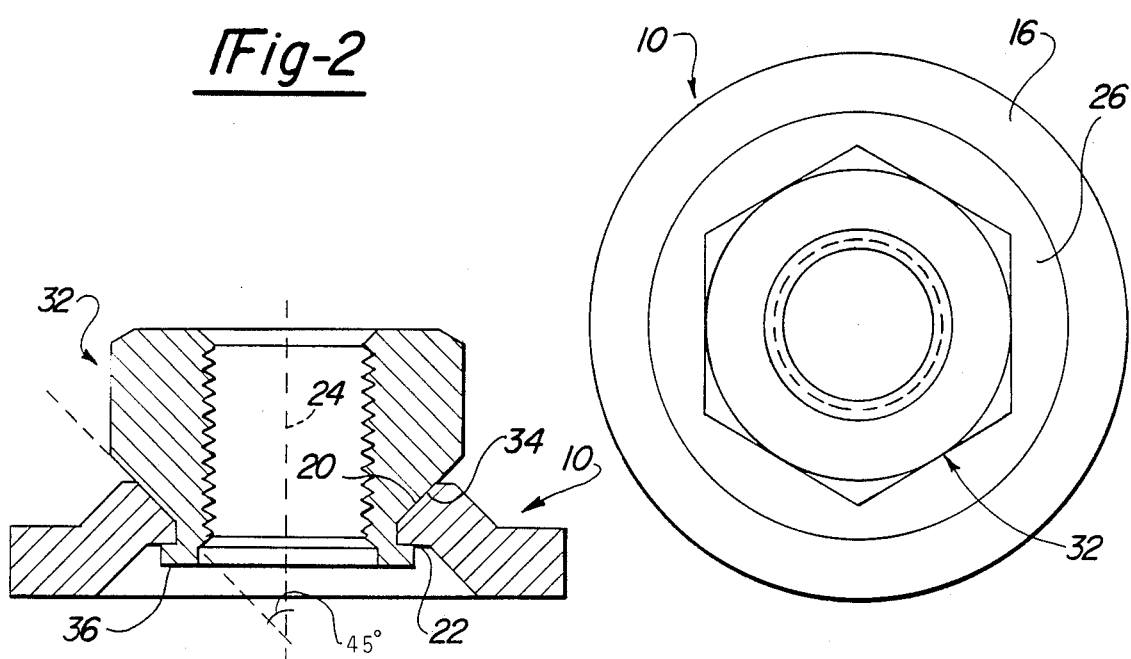
FIG. 4 is a sectional side view of the cantilevered washer of FIG. 1 combined with the female threaded fastener of FIG. 3.
Figure 5:
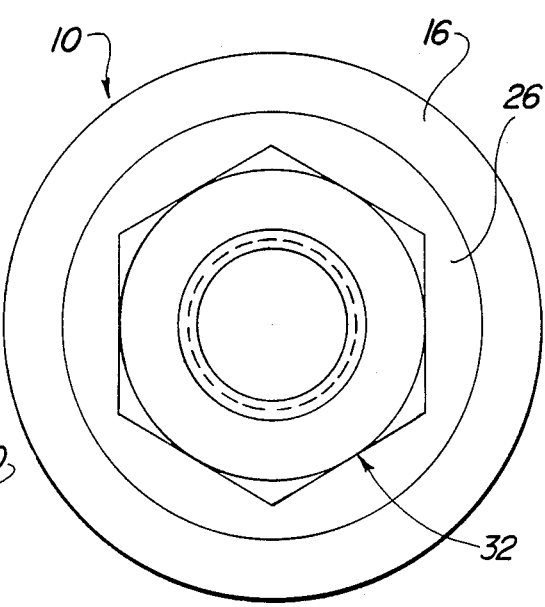
FIG. 5 is a plan view of the cantilevered washer and female threaded fastener combination of FIG. 4.

FIG. 3 shows a conventional female threaded fastener 32, most typically in the form of a hexagonal nut, including a conical portion 34 which is structured to mate with the conically-shaped seat 20 of the cantilevered washer. The female threaded fastener preferably has an annular flange portion 36 that is located adjacent the conical portion 34. The reason for including the annular flange portion is made clear from FIG. 4. After the female threaded fastener 32 is seated with its conical portion 34 mating with the conically-shaped seat 20 at the cantilevered washer, the annular flange portion 36 is swagged over the annular shoulder 22. Thus, the cantilevered washer 10 is thereby fastened to the female threaded fastener 32, but is free to rotate with respect thereto.

FIG. 6 shows the cantilevered washer 10 in combination with a male threaded fastener 38, most typically a bolt having a hexagonally-shaped head 40. The hexagonally-shaped head includes a conical portion 42 which is structured to mate with the conically-shaped seat 20 of the cantilevered washer 10. The male threaded fastener preferably has an annular flange portion 44 located adjacent the conical portion 42 for fastening the male threaded fastener to the cantilevered washer while permitting relative rotatability therebetween, in the manner described hereinabove for the female threaded fastener.

Figure 7:
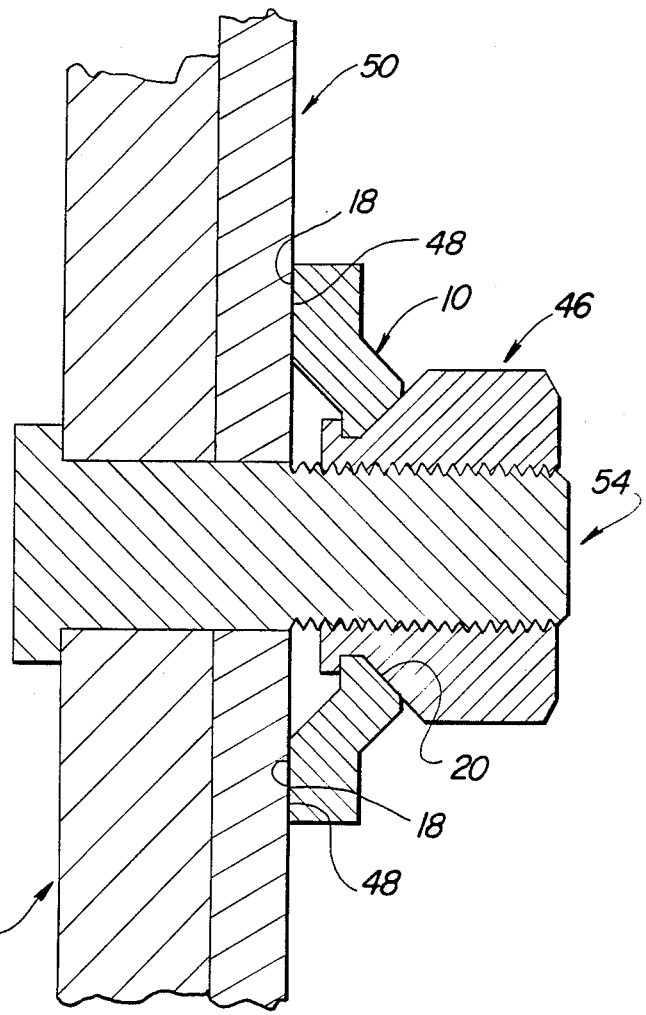
FIG. 7 is a sectional side view of the cantilevered washer according to the present invention in operation in an automotive wheel environment.

FIG. 7 shows the cantilevered washer 10 in a preferred form of operation. The cantilevered washer 10 is fastened to a female stud nut 46 in the manner hereinabove described for the conventional female threaded fastener 32. The flat annular base 18 of the cantilevered washer is mated with a flat surface 48 of a wheel disk 50 of a conventional wheel for a pneumatic tire. The wheel disk 50 is structured for conventional operation in a motor vehicle, as described hereinabove. In this regard, the wheel disk is removably attached to a wheel hub 52 by a plurality of stud bolts 54, only one of which is shown in the figure.

Operation will now be described with particular reference to FIGS. 1 and 7. When the stud nuts are tightened on the stud bolts, the conically-shaped seat 20 of the cantilevered washer is exposed to both the seating force of the stud nut as well as its hoop-stress. Because the resultant force F, shown particularly in FIG. 1, is along a direction normal to the conically-shaped seat 20, the cantilevered washer is uniformly loaded so that the cantilever portion may deflect under the imposed load, with the flat annular base at all times remaining flat on the wheel disk surface 48. Further, during operation of the motor vehicle, variable amounts of deflection of the wheel disk will occur. In conventional washer structures, there is no true torsional accommodation, resulting in columnar loading and brinelling into the wheel disk surface caused by squirming of the washer relative to the wheel disk surface. However, the cantilevered washer 10 according to the present invention does incorporate true torsional deflection at the cantilever portion and further includes uniform loading characteristics, in that the loading force is delivered by the threaded fastener at an angle to the cantilevered washer. As a result, deflection of the wheel disk is easily accommodated by deflection at the cantilever portion along a cone defined by D, and the flat annular base remains at all times flat in relation to the wheel disk surface. Accordingly, there is no squirm during deflection, and, therefore, no brinelling. As an added benefit, true torsional deflection prevents the threaded fastener from being loosened when loads are suddenly reduced. Thus, a threaded fastener will not be subjected to loosening during operation. It is preferred to form the cantilever portion 14 by cold forming techniques because this will best ensure that the grain of the metal flows uniformly from the conical seat portion 12 through the cantilever portion 14 to the annular ring portion 16. By having such a uniformly flowing grain structure, torsional deflection at the cantilever portion is predictable, metal fatigue caused by torsional deflection is prevented, and washer profile is minimized. Control over the degree of the deflection as a result of load is determined by the width 56 of the cantilever portion between the inner and outer frustoconical surfaces 28 and 26, respectively, a smaller width resulting in a higher degree of deflection for a given load.

As an example of the deflection characteristics hereinabove described for the cantilevered washer 10, below is a table showing deflection of a cantilevered washer 10 suitable for use in automotive wheel employments of the kind referred to hereinabove.

| LOAD | TOTAL ELASTIC DEFLECTION | | | | |
| --- | --- | --- | --- | --- | --- |
| | Test #1 | Test #2 | Test #3 | Test #4 | Test #5 |
| 1,000 lbs | 0 | 0 | 0 | 0 | 0 |
| 3,000 | .0042" | .0054" | .0035" | .0048" | .0040" |
| 5,000 | .0062 | .0068 | .0070 | .0066 | .0058 |
| 7,000 | .0095 | .0095 | .0098 | .0099 | .0085 |
| 9,000 | .0121 | .0121 | .0112 | .0120 | .0125 |
| 11,000 | .0136 | .0130 | .0135 | .0128 | .0135 |
| 13,000 | .0144 | .0140 | .0145 | .0138 | .0145 |
| 15,000 | .0154 | .0151 | .0148 | .0145 | .0149 |
| 17,000 | .0179 | .0175 | .0167 | .0160 | .0165 |
| 19,000 | .0189 | .0185 | .0178 | .0175 | .0180 |

-continued

| | TOTAL ELASTIC DEFLECTION | | | | |
|---|---|---|---|---|---|
| LOAD | Test #1 | Test #2 | Test #3 | Test #4 | Test #5 |
| 21,000 | .0195 | .0189 | .0190 | .0188 | .0190 |

Below is a brief description of the Load Deflection Test described in the table set forth above.

| FASTENER | Nut - C-1045 Screw Stock .230/.240, Washer, C-1035 cold formed .235" thick. Assembly - Heat to RC-26-34 coated with GM 6035 - (Curtis Processing). Nut and Washer assembled before H.T. and Plate. |
|---|---|
| TEST DESCRIPTION | Test run tensile machine axial load applied. Washer seated on SAE 1010 base plate to determine washer embedment on soft surface. Free dimension checked as shown, total data determined as per sample sheet. |

To those skilled in the art to which this invention appertains the above described preferred embodiment may be subject to change or modification. Such changes or modifications can be carried out without departing from the scope of the invention, which is intended to be limited only by the scope of the appended claims.

What is claimed is:

1. A washer for a threaded fastener comprising:
   a seat portion having a center axis;
   an annular ring portion parallel to said seat portion and offset from said seat portion along said center axis; said annular ring portion have a predetermined cross-section thickness;
   a frustoconically shaped cantilever portion connecting said seat portion and said annular ring portion, said cantilever portion having an inner frustoconical surface disposed at an angle between 40° and 50° relative to said center axis, an outer frustoconical surface and a cross-sectional thickness between said inner and outer frustoconical surfaces less than said predetermined cross-sectional thickness of said annular ring portion; and
   a conically-shaped seat provided through said seat portion concentric with said center axis, said conically-shaped seat being disposed at an angle normal to said inner frustoconical surface.

2. The washer of claim 1, wherein said cantilever portion of said washer is formed by cold forming.

3. The washer of claim 1, wherein said cross-sectional thickness between said inner frustoconical surface and said outer frustoconical surface is selected to provide a preselected degree of deflection of said cantilever portion in response to loading of said washer along said center axis.

4. The washer of claim 3, wherein said inner frustoconical surface of said cantilever portion is disposed at an angle of substantially 45° relative to said center axis of said washer.

5. The washer of claim 4, wherein said seat portion includes an annular shoulder adjacent said inner frustoconical surface of said cantilever portion.

6. The washer of claim 5, wherein said annular shoulder is spaced a predetermined distance along said center axis from said conically-shaped seat.

7. The washer of claim 6, wherein said annular ring portion has a flat annular base.

8. The washer of claim 7, wherein said annular ring portion is substantially rectangular in cross section and said flat annular base forms a part of said substantially rectangular cross section.

9. The washer of claim 8, wherein said cantilever portion of said washer is formed by cold forming.

10. The washer of claim 9, wherein said flat annular base is oriented perpendicularly with respect to said center axis; further wherein said flat annular base remains oriented perpendicularly with respect to said center axis when said washer is loaded along said center axis.

11. A washer and threaded fastener combination comprising:
    a washer comprising:
       a seat portion having a center axis;
       an annular ring portion parallel with said seat portion and offset from said seat portion, said annular ring portion having a first predetermined cross-sectional thickness;
       a frustoconically-shaped cantilever portion connecting said seat portion and said annular ring portion, said cantilever portion having an inner frustoconical surface disposed at an angle of approximately 45° relative to said center axis, a generally parallel outer frustoconical surface, and a second predetermined cross-sectional thickness between said inner and outer frustoconical surfaces less than said first predetermined cross-sectional thickness of said annular ring portion; and
       a conically-shaped seat provided through said seat portion concentric with said center axis, said conically-shaped seat being disposed at an angle substantially normal to said inner and outer frustoconical surfaces; and
    a threaded fastener having a conically-shaped portion that is complementarily shaped with respect to said conically-shaped seat of said washer for seating said threaded fastener thereinto.

12. THe washer and threaded fastener combination of claim 11, wherein said cantilever portion of said washer is formed by cold forming.

13. The washer and threaded fastener combination of claim 12, wherein said cross-sectional thickness between said inner frustoconical surface and said outer frustoconical surface is selected to provide a preselected degree of deflection of said cantilever portion in response to loading of said washer by said fastener along said center axis when said threaded fastener is seated in said conically-shaped seat of said washer.

14. The washer and threaded fastener combination of claim 11, wherein said seat portion of said washer includes an annular shoulder adjacent said inner frustoconical surface of said cantilever portion of said washer; further wherein said threaded fastener includes retaining means for retaining said washer with respect to said threaded fastener, said washer being independently rotatable with respect to said threaded fastener.

15. The washer and threaded fastener combination of claim 14, wherein said retaining means comprises an annular flange portion on said threaded fastener which is swagged over said annular shoulder of said seat portion of said washer for retaining said washer with respect to said threaded fastener.

16. The washer and threaded fastener combination of claim 15, wherein said annular shoulder of said conical seat portion is spaced along said center axis of said washer a predetermined distance from said conically-shaped seat of said washer.

17. The washer and threaded fastener combination of claim 16, wherein said annular ring portion of said washer has a flat annular base.

18. The washer and threaded fastener combination of claim 17, wherein said annular ring portion is substantially rectangular in cross section and said flat annular base forms a portion of said substantially rectangular cross section.

19. The washer and threaded fastener combination of claim 18, wherein said cantilever portion of said washer is formed by cold forming.

20. The washer and threaded fastener combination of claim 19, wherein said flat annular base is oriented perpendicularly with respect to said center axis; further wherein said flat annular base remains oriented perpendicularly with respect to said center axis when said washer is loaded by said threaded fastener along said center axis.

21. A wheel system for a motor vehicle, said wheel system including a plurality of wheel mounting devices, each of said wheel mounting devices comprising:
  a wheel hub connected to said motor vehicle, said wheel hub including a plurality of stud bolts projecting therefrom;
  a motor vehicle wheel including a wheel disk, said wheel disk having a plurality of apertures for aligning with said plurality of stud bolts, said motor vehicle wheel being removably mountable on said wheel hub;
  a plurality of washers, one washer of said plurality of washers for each stud bolt of said plurality of stud bolts, each washer of said plurality of washers comprising:
    a seat portion having a center axis;
    an annular ring portion parallel to said seat portion and offset from said seat portion, said annular portion having a first predetermined cross-sectional thickness; and
    a frustoconically-shaped cantilever portion connecting said seat portion and said annular ring portion, said cantilever portion having an inner frustoconical surface disposed at an angle of substantially 45° relative to said center axis, and a second predetermined cross-sectional thickness less than said first predetermined cross-sectional thickness;
    a conically-shaped seat provided through said seat portion concentric with said center axis, said conically-shaped seat having a seating surface substantially normal to said inner frustoconical surface; and
  a plurality of threaded stud nuts, one threaded stud nut of said plurality of threaded stud nuts for each stud bolt of said plurality of stud bolts, each threaded stud nut of said plurality of threaded stud nuts having a conically-shaped portion that is complementarily shaped with respect to said conically-shaped seat of each said washer for seating each said threaded stud nut in said conically-shaped seat of a respective washer.

22. The wheel system for a motor vehicle of claim 21, wherein said cantilever portion of each said washer has an outer frustoconical surface being in substantially parallel alignment with said inner frustoconical surface, further wherein said second predetermined cross-sectional thickness between said inner frustoconical surface and said outer frustoconical surface is selected to provide a preselected degree of deflection of said cantilever portion in response to loading of each said washer by said respective threaded stud nut along said center axis when said respective threaded stud nut is seated in said conically-shaped seat of said respective washer.

23. The wheel system for a motor vehicle of claim 22, wherein said seat portion of each washer includes an annular shoulder adjacent said inner frustoconical surface of said cantilever portion of each said washer; further wherein each said threaded stud nut includes retaining means for retaining a respective washer with respect to a respective threaded stud nut, said respective washer being independently rotatable with respect to said respective threaded stud nut.

24. The wheel system for a motor vehicle of claim 23, wherein said retaining means comprises a flanged portion on said respective threaded stud nut which is swagged over said annular shoulder of said seat portion of said respective washer for retaining said respective washer with respect to said respective threaded stud nut.

25. The wheel system for a motor vehicle of claim 24, wherein said annular shoulder of said seat portion of each said washer is spaced along said center axis of each said washer a predetermined distance from said conically-shaped seat of each said washer.

26. The wheel system for a motor vehicle of claim 25, wherein said annular ring portion of each said washer has a flat annular base.

27. The wheel system for a motor vehicle of claim 26, wherein said annular ring portion of each said washer is substantially rectangular in cross section and said flat annular base forms a portion of said substantially rectangular cross section.

28. The wheel system for a motor vehicle of claim 27, wherein said cantilever portion of each said washer is formed by cold forming.

29. The wheel system for a motor vehicle of claim 28, wherein said flat annular base of each said washer is oriented perpendicularly with respect to said center axis; further wherein said flat annular base of each said washer remains oriented perpendicularly with respect to said center axis when each said washer is loaded by said respective threaded stud nut along said center axis.

* * * * *

UNITED STATES PATENT AND TRADEMARK OFFICE
CERTIFICATE OF CORRECTION

PATENT NO. : 4,971,498

DATED : November 20, 1990

INVENTOR(S) : Ronald D. Goforthe

It is certified that error appears in the above-identified patent and that said Letters Patent is hereby corrected as shown below:

On the title page, in the ABSTRACT, delete "an" and insert --a--.

Column 3, line 68, delete "potion" and insert ---- portion ----.

Column 5, line 21, delete "annular".

Column 5, line 22, after "the" insert ---- annular ----.

Column 7, line 22, after "appertains" insert a comma ---- , ----.

Column 7, line 32, delete "have" and insert ---- having ----.

Column 7, line 33, delete "cross-section" and insert ---- cross-sectional ----.

Column 8, line 40, delete "THe" and insert ---- The ----.

Column 8, line 67, delete "conical".

UNITED STATES PATENT AND TRADEMARK OFFICE
CERTIFICATE OF CORRECTION

PATENT NO. : 4,971,498

DATED : November 20, 1990

INVENTOR(S) : Ronald D. Goforthe

It is certified that error appears in the above-identified patent and that said Letters Patent is hereby corrected as shown below:

Line 4, delete "maner" and insert ---- manner ----.

Line 20, delete "tenchniques" and insert ---- techniques ----.

Line 21, delete "grip" and insert ---- grain ----.

Signed and Sealed this

Nineteenth Day of May, 1992

*Attest:*

DOUGLAS B. COMER

*Attesting Officer*     *Acting Commissioner of Patents and Trademarks*